United States Patent [19]

Spencer

[11] 4,110,795
[45] Aug. 29, 1978

[54] METHOD OF GRAPHIC DATA REDUNDANCY REDUCTION IN AN OPTICAL FACSIMILE SYSTEM

[75] Inventor: David R. Spencer, Melville, N.Y.
[73] Assignee: Litton Systems, Inc., Melville, N.Y.
[21] Appl. No.: 752,331
[22] Filed: Dec. 20, 1976
[51] Int. Cl.² ............................................. H04N 7/12
[52] U.S. Cl. ................................... 358/260; 358/256; 340/347 DD
[58] Field of Search ...................... 358/260, 261, 256; 340/347 DD

[56] References Cited

U.S. PATENT DOCUMENTS 3,849,592  11/1974  Rosenheck ........................... 358/260
4,004,079  1/1977   Boston ................................. 358/256

OTHER PUBLICATIONS

Spencer, "Bit Plane Coding of Continuous-Tone Pictures," pp. 101–120, 1969.

Primary Examiner—Howard W. Britton
Attorney, Agent, or Firm—Robert F. Rotella; Norman Friedman; William L. Muckelroy

[57] ABSTRACT

A method of graphic data redundancy reduction in an optical facsimile system wherein picture elements are optically represented by a grey coded number having N digits where N is at least 5 comprising evaluating at least the first N-2 bit planes to determine whether these bit planes should be processed in high or low resolution, and arbitrarily processing the remaining at least one bit plane at low resolution.

8 Claims, 5 Drawing Figures

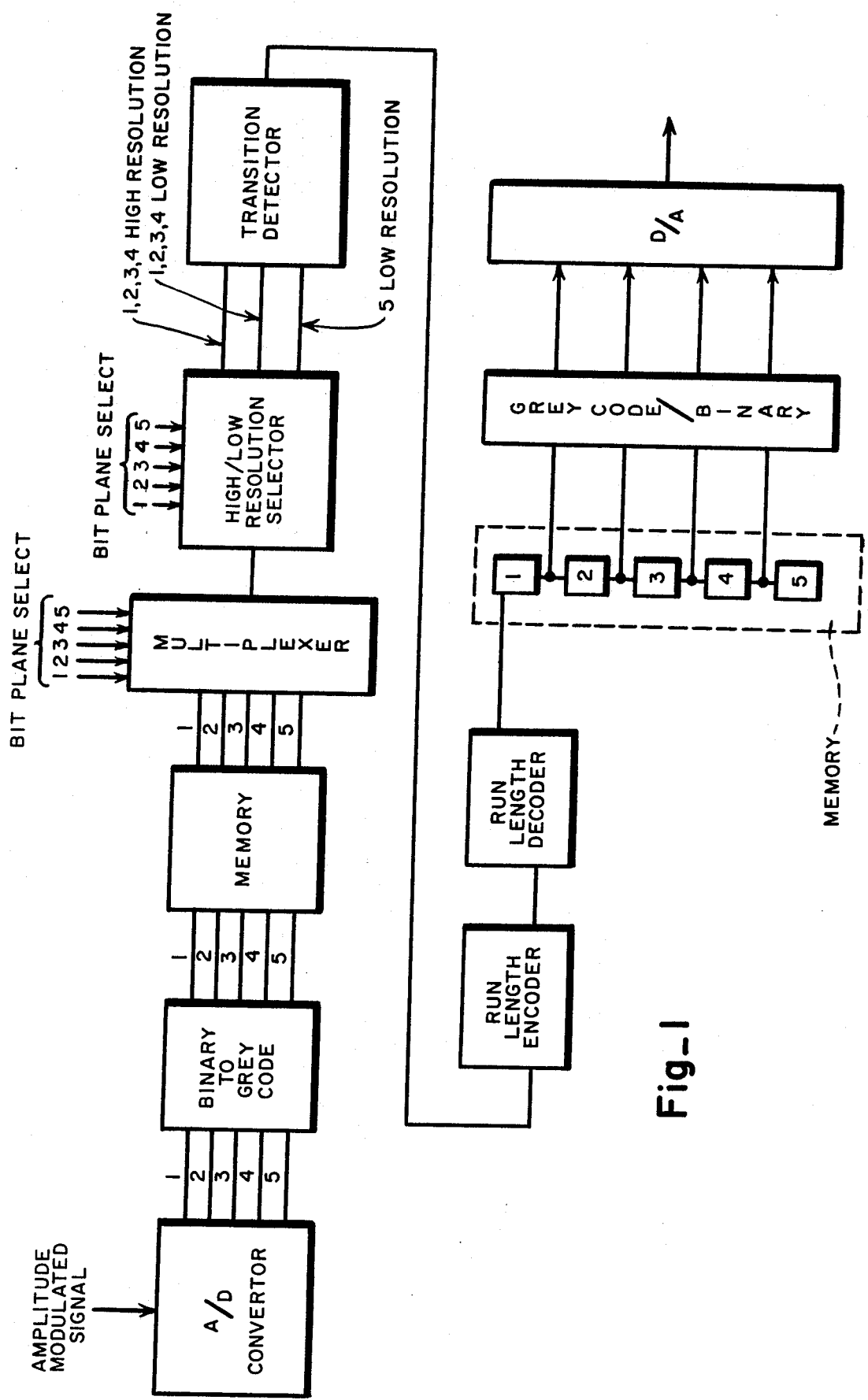
Fig_1

METHOD OF GRAPHIC DATA REDUNDANCY REDUCTION IN AN OPTICAL FACSIMILE SYSTEM

The present invention relates to graphic data redundancy reduction, and, more particularly, to graphic data redundancy reduction for grey scale optical facsimile systems.

A graphic data redundancy reduction system for an optical facsimile system is disclosed in U.S. Pat. No. 3,849,592. In this patent, graphic data redundancy reduction is disclosed for use with text and half-tone reproduction. In such systems, all printing can be digitized into single bit data codes since any picture element is either black or white. For example, the black could be digitized "1" with the absence of black or white being digitized by the digit "0".

When such graphic data redundancy reduction is applied to a similar type of optical facsimile system, such as in grey scale reproduction, the intensity of any picture element cannot be represented by a single digitized number. In such grey scale reproduction, gradations must be defined to a plurality of gradations between text (black) and the absence of text or white.

Conventionally, these graded intensities are represented by a grey code with digits having a number selected to assure the degree of accuracy required or desired. In the system disclosed in the aforementioned patent, data redundancy reduction was dependent on the degree of busyness, i.e. the frequency of digit changes along the scan line. As done in this patent, a busyness detector sequentially analyzes each of the bit planes (there is only one bit plane in this patent) of the grey code digitized representations of the picture elements along the scan line so that a decision can be made as to whether the busyness reading is low enough to justify data redundancy reduction and once this decision has been made the mode of operation of the facsimile system will change from high resolution to low resolution.

It is an object of the present invention to provide a system for simplifying graphic data redundancy reduction when the picture elements are digitally represented by a multi-digit code.

Additional objects and advantages of the present invention will become apparent from the following portion of this specification and from the accompanying drawings which illustrate, in accordance with the mandate of the patent statutes, presently preferred embodiments incorporating the teachings of the invention.

Referring to the drawings

FIG. 1 is a black diagram illustrating an auto resolution circuit for an optical facsimile system made in accordance with the teachings of the present invention;

In the disclosed optical facsimile system, where grey scale reproduction is to be achieved, the intensity (blackness) of a picture element along a scan line is, by use of pulse code modulation (A/D convertor), represented by a multi (5) digit binary number. These five digits are directed from the A/D convertor to a Binary to Grey Code Convertor and the digitized representation, now in grey code, is entered into memory.

In accordance with the disclosure of the aforementioned patent, which is incorporated by reference herein, individual bit planes are analyzed to ascertain the frequency of changes in the scanned picture elements which make up a scan line and a decision is made on a bit plane by bit plane basis to determine whether there should be high or low resolution of the scanned data.

It has been found that the accuracy of the line of print will not be substantially deleteriously affected if an arbitrary decision is made to send the last bit plane at low resolution. As illustrated in FIG. 1, a busyness analysis, such as is made in the above referred to patent, is made in a high/low resolution selector on each of the first four bit planes. When the bit plane select signal identifies the fifth digit, the high/low resolution selector does not make a busyness decision, but automatically selects low resolution processing of the fifth bit plane. For the first four bit planes of a five digit grey coded number, high or low resolution will depend on the degree of busyness.

The data is then processed in a conventional manner by a transition detector, run length encoder, run length decoder, a five section memory, a grey code to binary converter and a digital to analog convertor.

Figure 2:
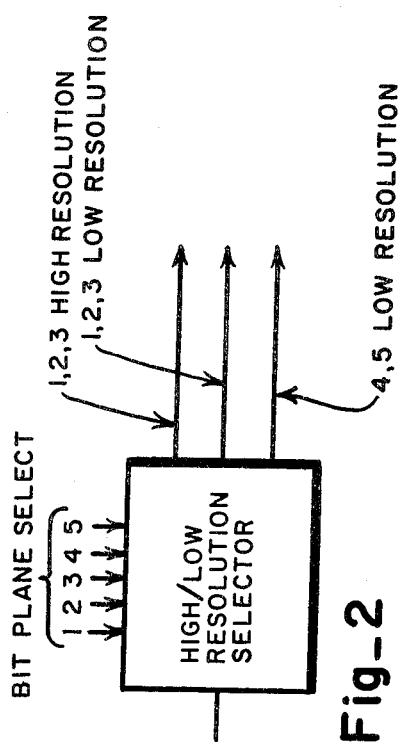
FIG. 2 is a first alternate embodiment of the high/low resolution selection illustrated in FIG. 1.

As shown in FIG. 2, this concept could, in some situations, be extended to the fourth digit in addition to the fifth digit where high accuracy reproduction is not required.

Figure 3:
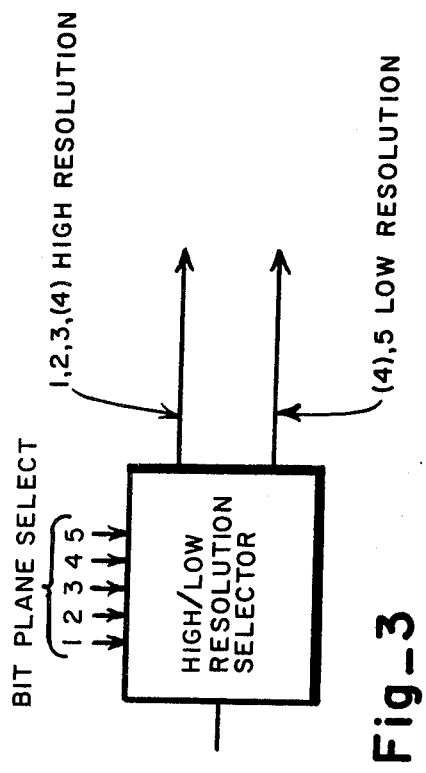
FIG. 3 is a second alternate embodiment of the high/low resolution selection illustrated in FIG. 1.

It has also been found that an efficient solution can be achieved by arbitrarily processing the first three (or four) bit planes in high resolution with the last two (or one) bit planes in low resolution as illustrated in FIG. 3.

Figure 4:
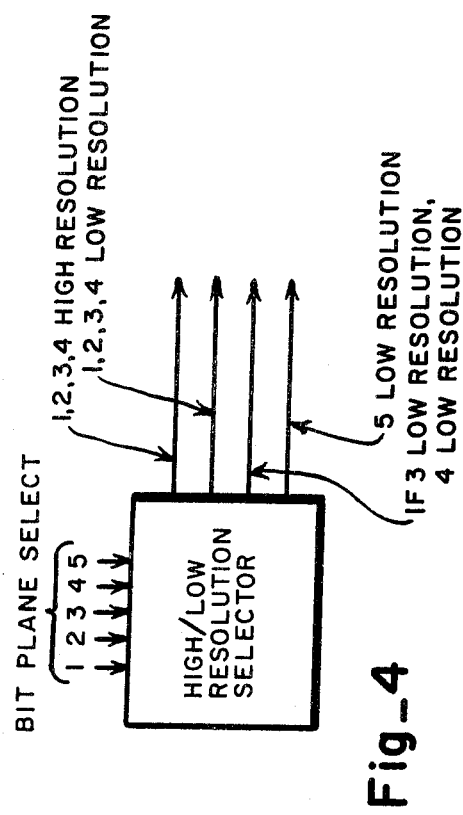
FIG. 4 is a third alternate embodiment of the high/low resolution selection illustrated in FIG. 1.
Figure 5:
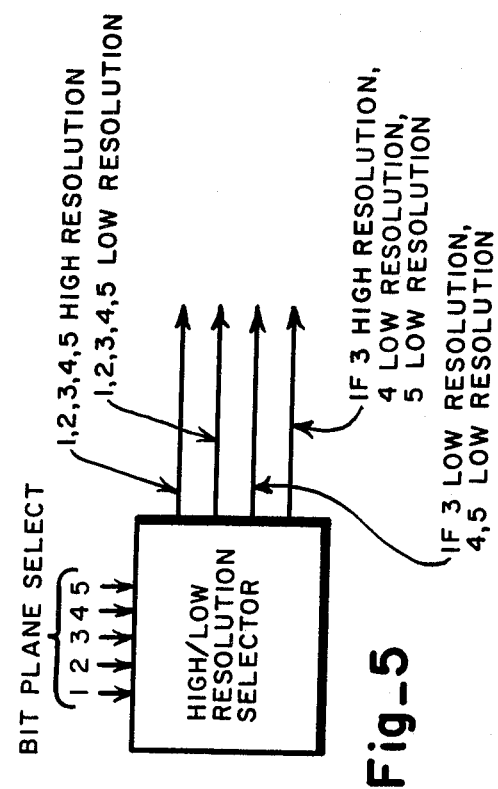
FIG. 5 is a fourth alternate embodiment of the high/low resolution selection illustrated in FIG. 1.

The third and fourth alternate embodiments illustrated in FIGS. 4 and 5 illustrate a modification wherein the numbered bit plane at which low resolution is arbitrarily selected can be either the fourth or fifth bit plane depending on the resolution of the adjacent portion of the third and fourth bit planes. For example, in FIG. 4, the fifth bit plane will always be processed at low resolution, but the fourth bit plane will only be processed at low resolution if the third bit plane was processed at low resolution. As shown in FIG. 5, if the third bit plane is processed at low resolution, the fourth and fifth bit planes will be automatically processed at low resolution. Where the third bit plane is processed at high resolution and the fourth bit plane is processed in low resolution, the fifth bit plane will be processed in low resolution, but, if both the third and fourth bit planes are processed in high resolution, a busyness decision will be made on the fifth bit plane by the high/low resolution selector to determine whether the fourth and fifth bit planes are to be processed in high or low resolution.

What is claimed is:

1. A method of graphic data redundancy reduction in an optical facsimile system wherein picture elements are optically represented by a grey coded number having N digits where N is at least 5 comprising evaluating at least the first N−2 bit planes to determine whether these bit planes should be processed in high or low resolution, and arbitrarily processing the remaining at least one bit plane at low resolution.

2. A method according to claim 1, wherein N equals 5 and the last bit plane is arbitrarily processed in low resolution.

3. A method according to claim 1, wherein N equals 5 and the last two bit planes are arbitrarily processed in low resolution.

4. A method according to claim 1, further comprising
determining the number of last bit planes which are to be processed at low resolution by processing all the last bit planes beyond the N−2 bit plane at low resolution if the N−2 or N−1 bit plane is processed at low resolution.

5. A method of graphic data redundancy reduction in an optical facsimile system wherein picture elements are optically represented by a grey coded number having N digits where N is at least 5 comprising
arbitrarily processing at least the first N−2 bit planes in high resolution, and
arbitrarily processing the remaining at least one bit plane at low resolution.

6. A method according to claim 5, wherein N equals 5 and only the last bit plane is arbitrarily processed at low resolution.

7. A method according to claim 5, wherein N equals 5 and only the last two bit planes are arbitrarily processed at low resolution.

8. A method of data redundancy reduction in an image processing system wherein picture elements are represented by a binary number having N digits, the method comprising
arbitrarily processing a first number of bit planes at high resolution starting with the most significant bit planes wherein the first number is zero or more,
evaluating a second number of bit planes to determine whether the second number of bit planes should be processed at high or low resolution, wherein the second number is zero or more,
wherein after processing a bit plane at low resolution, the balance of subsequent bit planes of said second number is processed at low resolution, and
arbitrarily processing a third number of bit planes at low resolution ending with the least significant bit plane.

* * * * *